United States Patent
Jiang et al.

(10) Patent No.: US 8,544,019 B2
(45) Date of Patent: *Sep. 24, 2013

(54) THREAD QUEUEING METHOD AND APPARATUS

(75) Inventors: Hong Jiang, El Dorado Hills, CA (US); Thomas A. Piazza, Granite Bay, CA (US); Brian D. Rauchfuss, Folsom, CA (US); Sreedevi Chalasani, San Francisco, CA (US); Steven J. Spangler, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/116,245

(22) Filed: May 26, 2011

(65) Prior Publication Data
US 2011/0314479 A1 Dec. 22, 2011

Related U.S. Application Data

(63) Continuation of application No. 11/647,608, filed on Dec. 30, 2006, now Pat. No. 7,975,272.

(51) Int. Cl.
*G06F 9/46* (2006.01)
*G06F 15/00* (2006.01)

(52) U.S. Cl.
USPC ........... 718/106; 718/102; 712/216; 712/217; 712/225

(58) Field of Classification Search
None
See application file for complete search history.

(56) References Cited

U.S. PATENT DOCUMENTS

| | | | |
|---|---|---|---|
| 6,389,446 B1 | 5/2002 | Torii | |
| 6,505,229 B1 | 1/2003 | Turner et al. | |

(Continued)

FOREIGN PATENT DOCUMENTS

| | | |
|---|---|---|
| JP | 03-164945 A | 7/1991 |
| JP | 2002-140201 A | 5/2002 |

(Continued)

OTHER PUBLICATIONS

White Paper, "Intel's Next Generation Integrated Graphics Architecture—Intel Graphics Media Accelerator X3000 and 3000", Jul. 2006, Intel, (pp. 1-14, total 14 pages).

(Continued)

*Primary Examiner* — Jennifer To
(74) *Attorney, Agent, or Firm* — Buckley, Maschoff & Talwalkar LLC

(57) ABSTRACT

In some embodiments, a method includes receiving a request to generate a thread and supplying a request to a queue in response at least to the received request. The method may further include fetching a plurality of instructions in response at least in part to the request supplied to the queue and executing at least one of the plurality of instructions. In some embodiments, an apparatus includes a storage medium having stored therein instructions that when executed by a machine result in the method. In some embodiments, an apparatus includes circuitry to receive a request to generate a thread and to queue a request to generate a thread in response at least to the received request. In some embodiments, a system includes circuitry to receive a request to generate a thread and to queue a request to generate a thread in response at least to the received request, and a memory unit to store at least one instruction for the thread.

30 Claims, 10 Drawing Sheets

(56) References Cited

U.S. PATENT DOCUMENTS

| | | |
|---|---|---|
| 6,609,193 B1 | 8/2003 | Douglas et al. |
| 6,889,319 B1 | 5/2005 | Rodgers et al. |
| 6,907,520 B2 | 6/2005 | Parady |
| 7,054,950 B2 | 5/2006 | Putzolu |
| 7,069,414 B2 | 6/2006 | Venkatraman |
| 7,117,498 B2 | 10/2006 | Li |
| 7,134,002 B2 | 11/2006 | Shoemaker |
| 7,149,226 B2 | 12/2006 | Wolrich et al. |
| 7,149,880 B2 | 12/2006 | Kottapalli |
| 7,149,881 B2 | 12/2006 | Kottapalli et al. |
| 7,188,041 B1 | 3/2007 | Secatch |
| 7,234,139 B1 | 6/2007 | Feinberg |
| 8,230,423 B2 * | 7/2012 | Frigo et al. ............... 718/102 |
| 2003/0018691 A1 | 1/2003 | Bono |
| 2003/0046521 A1 | 3/2003 | Shoemaker |
| 2003/0126416 A1 | 7/2003 | Marr et al. |
| 2003/0147409 A1 | 8/2003 | Wolrich et al. |
| 2003/0191927 A1 | 10/2003 | Joy et al. |
| 2008/0163215 A1 | 7/2008 | Jiang et al. |

FOREIGN PATENT DOCUMENTS

| | | |
|---|---|---|
| RU | 2286595 C2 | 10/2006 |
| WO | 03/007105 A2 | 1/2003 |
| WO | 2006/074027 A2 | 7/2006 |
| WO | 2006/083541 A2 | 8/2006 |

OTHER PUBLICATIONS

"Russian Official Action", dated Nov. 16, 2010, along with English translation, Russian Patent Application No. 2009129258, 13pgs.

"European Communication pursuant to Article 94(3) EPC", dated Aug. 13, 2010 for European Patent Application No. 07869461.9-2211, 5pgs.

"PCT International Search Report", dated May 20, 2008 for International Application No. PCT/US2007/088008, 3pgs.

Tohru Saitoii et al., "Data-Driven Architecture on Pipelined Thread Processing", Mar. 1997, The Transactions of the Institute of Electronics, Information and Communication Engineers D-1, vol. J80-D-1, No. 3, (cover 1 pg. + pp. 181-188 + p. 323 + 2pgs, 13 pages total).

Amir Roth et al., "Effective Jump-Pointer Prefetching for Linked Data Structures", Copyright 1999, ISCA '99, Proceedings of th3 26th Annual International Symposium on Computer Architecture, IEEE Computer Society, Washington, DC, USA, (cover 1pg. + pp. 111-121 + 1pg., 13 pages total).

Tadahiko Itoh et al., "Japanese Office Action and Translation of an Office Action of Japan Patent Office", drafting date Mar. 14, 2012, for Japanese Application No. 2009-544188, 16pgs.

* cited by examiner

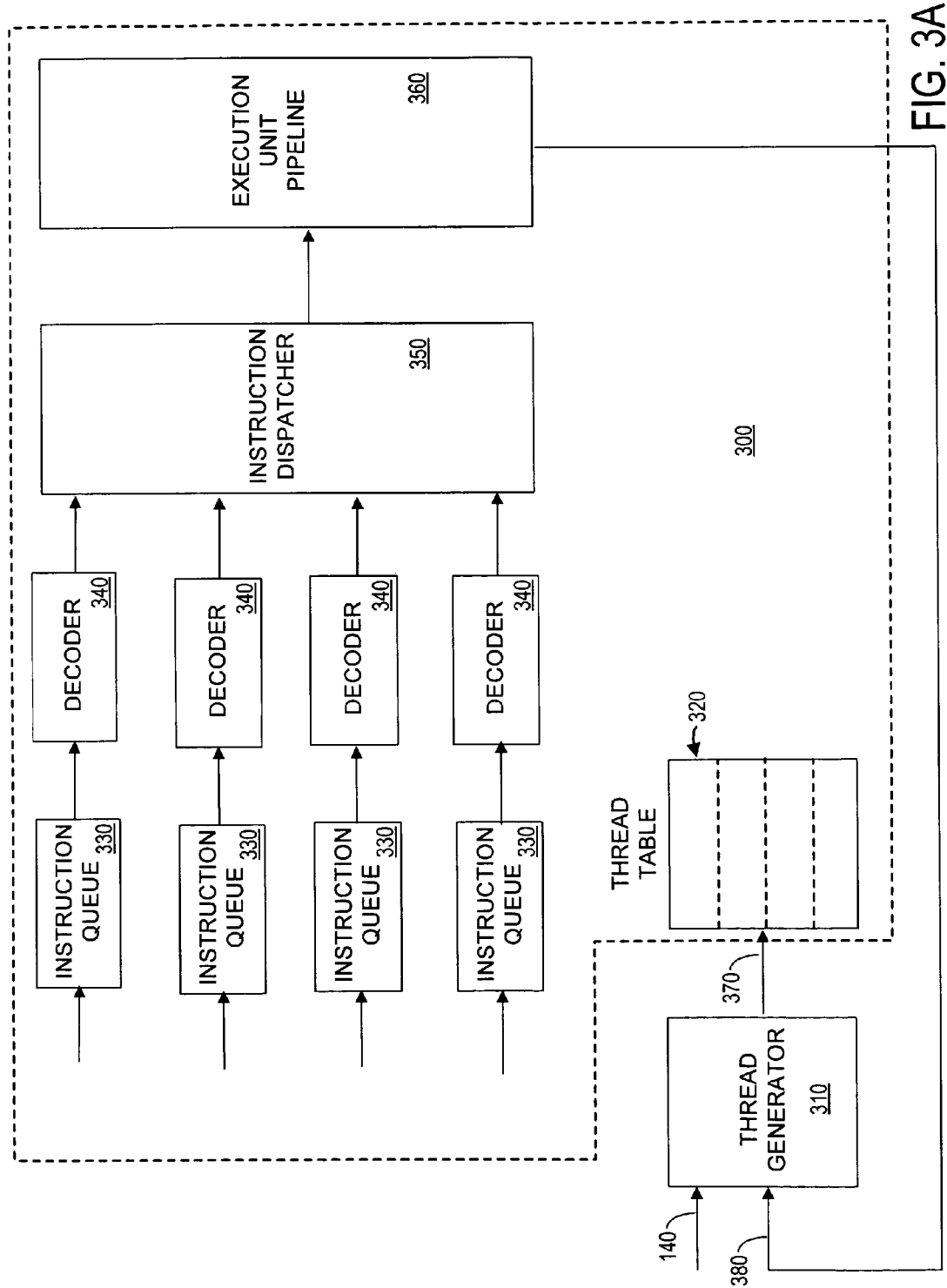

THREAD QUEUEING METHOD AND APPARATUS

CROSS REFERENCE TO RELATED APPLICATION

This is a continuation of U.S. patent application Ser. No. 11/647,608, filed Dec. 30, 2006, now issued as U.S. Pat. No. 7,975,272.

BACKGROUND

To improve performance, a processing system may have the ability to execute more than one thread. For example, a processing system may have the ability to execute a thread until one or more events occur, for example, being forced into a stall mode while waiting for data, and to then begin executing another thread.

In one multithreading processing system, an execution unit has multiple channels, two or more of which each have the ability to execute two or more threads.

Notwithstanding the current state of multithreading systems, further methods and apparatus for use in generating and/or executing threads in a multithreading system are desired.

BRIEF DESCRIPTION OF THE DRAWINGS

FIG. 3A is a block diagram of a portion of the processing system of FIG. 1, according to some embodiments.

DETAILED DESCRIPTION

Some embodiments described herein are associated with a "processing system." As used herein, the phrase "processing system" may refer to any system that processes data. In some embodiments, a processing system is associated with a graphics engine that processes graphics data and/or other types of media information. In some cases, the performance of a processing system may be improved with the use of a SIMD execution unit. For example, a SIMD execution unit might simultaneously execute a single floating point SIMD instruction for multiple channels of data (e.g., to accelerate the transformation and/or rendering three-dimensional geometric shapes). Other examples of processing systems include a Central Processing Unit (CPU) and a Digital Signal Processor (DSP).

Figure 1:
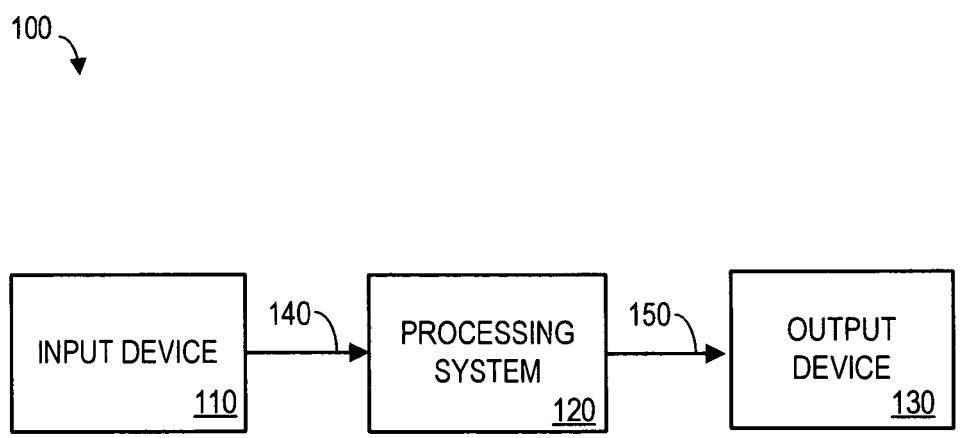
FIG. 1 is a block diagram of system, according to some embodiments.

FIG. 1 is a block diagram of a system 100, according to some embodiments. Referring to FIG. 1, the system 100 includes an input device 110, a processing system 120 and an output device 130. The input device 110 may be coupled to the processing system 120 through a communication link 140. The processing system 120 may be coupled to the output device 130 through a communication link 150.

In operation, the input device 110 may supply information to the processing system through the communication link 140. The processing system 120 may receive the information provided by the input device 110 and may store information and/or provide information to the output device 140, e.g., a display device 140, through the communication link 150.

As used herein, a communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

In some embodiments a processing system includes one or more processors. As used herein, a processor may be any type of processor. For example, a processor may be programmable or non programmable, general purpose or special purpose, dedicated or non dedicated, distributed or non distributed, shared or not shared, and/or any combination thereof. If the processor has two or more distributed portions, the two or more portions may communicate with one another through a communication link. A processor may include, for example, but is not limited to, hardware, software, firmware, hardwired circuits and/or any combination thereof.

Figure 2:
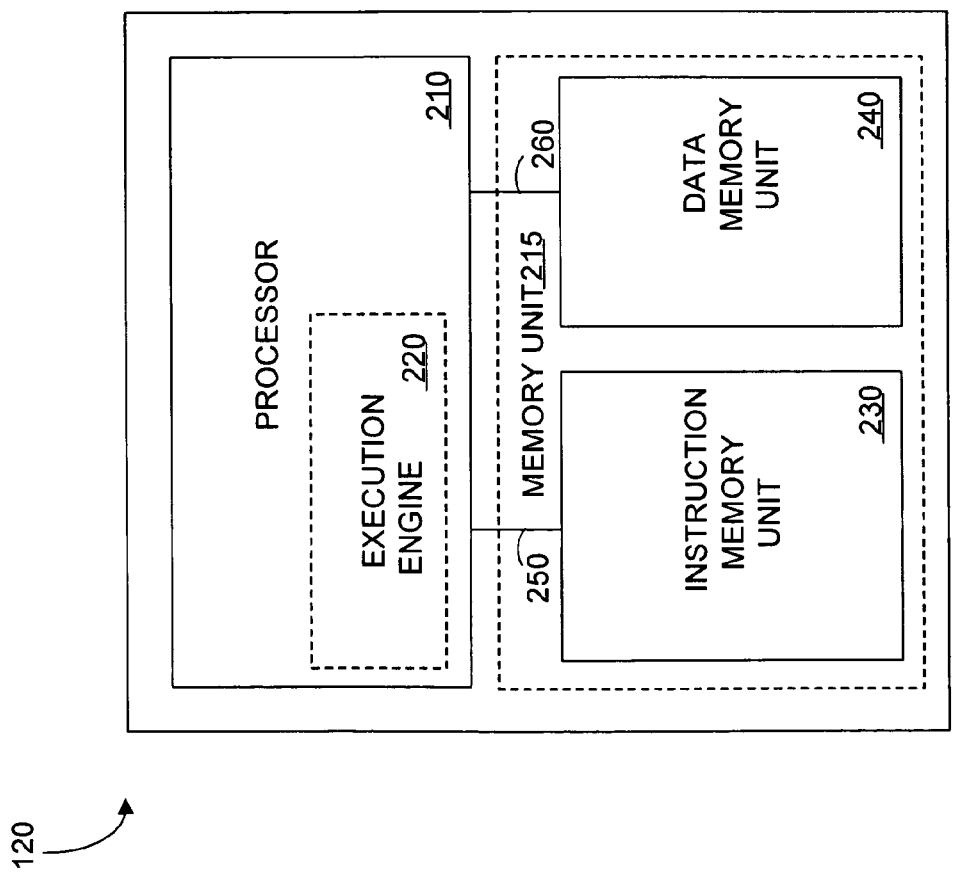
FIG. 2 is a block diagram of a processing system of the system of FIG. 1, according to some embodiments.

FIG. 2 is a block diagram of the processing system 120, according to some embodiments. Referring to FIG. 2, in some embodiments, the processing system 120 includes a processor 210 and a memory unit 215. The processor 210 may include an execution unit 220 and may be associated with, for example, a general purpose processor, a digital signal processor, a media processor, a graphics processor and/or a communication processor.

The memory unit 215 may store instructions and/or data (e.g., scalars and vectors associated with a two-dimensional image, a three-dimensional image, and/or a moving image) and may be coupled to the processor 210 through one or more communication links. In some embodiments, the memory unit 215 or a portion thereof comprises a hard disk drive (e.g., to store and provide media information), volatile memory such as, for example, random access memory (RAM) and/or non-volatile memory such as, for example, FLASH memory.

In some embodiments, the memory unit 215 includes an instruction memory unit 230, which may store instructions, and a data memory unit 240, which may store data. The instruction memory unit 230 may be coupled to the processor through a communication link 250. The data memory unit 240 may be coupled to the processor through a communication link 260. In some embodiments, the instruction memory unit 230 and/or the data memory unit 240 are associated with separate instruction and data caches, a shared instruction and data cache, separate instruction and data caches backed by a common shared cache, or any other cache hierarchy.

FIG. 3A, is a block diagram of a portion of a processing system, according to some embodiments. Referring to FIG. 3A, in some embodiments, a processing system may include an execution unit 300 and a thread generator 310. In some embodiments, the execution unit 300 may include a thread table 320, a plurality of instructions queues 330, a plurality of decoders 340, an instruction dispatcher 350 and an execution unit pipeline 360.

In some embodiments, commands may be supplied to an input of the thread generator 310 through a communication link 140. The commands may be supplied from any command source, including for example but not limited to a host and/or an input device 110 (FIG. 1). In some embodiments, the thread generator may also receive commands from the execution unit pipeline 360 through one or more signal lines and/or a bus 380. The thread generator 310 may process the commands, which may include requests to generate one or more threads, and may generate the one or more threads in response at least thereto. One or more outputs of the thread generator 310 may supply one or more threads, definition for which in turn may be supplied through one or more signal lines 370 to one or more inputs of the thread table 320. Each thread may include a set of instructions, which may be fetched from an instruction cache or other memory, which may store a plurality of instructions defining one, some or all parts of one or more programs being executed and/or to be executed by the processing system. The instructions for each thread defined by the thread table may be supplied to a respective one of the instruction queues 330, each of which may be sized, for example, to store a small number of instructions, e.g., six to eight instructions. Instructions from each instruction queue 330 may be supplied to an input of a respective one of the decoders 340. The decoders 340 may supply the decoded instructions to the instruction dispatcher 350, which may supply the decoded instructions for one or more threads being executed to the execution pipeline 360, which may execute the decoded instructions.

Figure 3B:
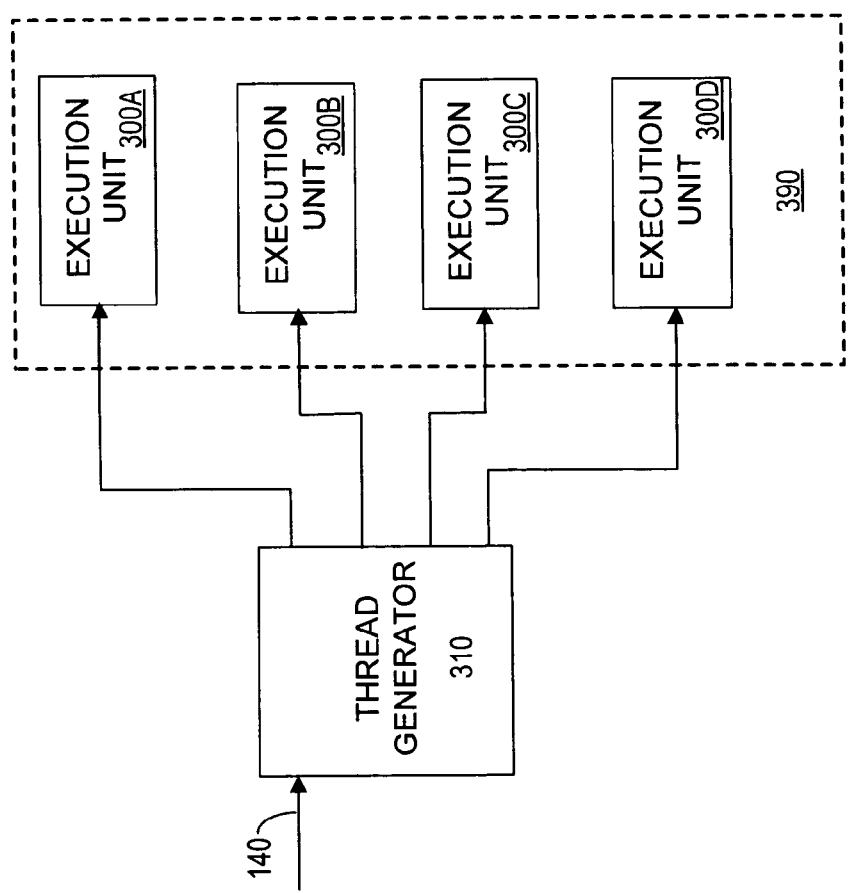
FIG. 3B is a block diagram of a portion of the processing system of FIG. 1, according to some embodiments.

FIG. 3B is a block diagram of a portion of a processing system, according to some embodiments. Referring to FIG. 3B, in some embodiments, a processing system includes an execution unit 390 and a thread generator 310. In some embodiments, the execution unit 390 may include a plurality of execution units, e.g., execution units 300A-300D. In some embodiments, each of the execution units 300A-300D may be the same as and/or similar to the execution unit 300 (FIG. 3A).

In some embodiments, commands may be supplied to an input of the thread generator 310 through a communication link 140. The commands may be supplied from any command source, including for example but not limited to a host and/or an input device 110 (FIG. 1). In some embodiments, the thread generator may also receive commands from one or more of the execution units 300A-300D. The thread generator 310 may process the commands, which may include requests to generate one or more threads, and may generate the one or more threads in response at least thereto. One or more outputs of the thread generator 310 may supply one or more threads, definition for which in turn may be supplied to one or more of the execution units 300A-300D, for example, one or more inputs of one or more thread tables (see for example, thread table 320 (FIG. 3A)) of one or more of the execution units 300A-300D. In some embodiments, operation of the execution units 300A-300D may be the same as and/or similar to operation of the execution unit 300 (FIG. 3A) described above.

In some embodiments, the execution unit (300A, 300B, 300C, or 300D) may comprise a SIMD execution unit. In some embodiments, a SIMD execution unit may receive an instruction (e.g., from an instruction memory unit) along with a four-component data vector (e.g., vector components). The execution unit may then simultaneously execute the instruction for all of the components in the vector. Such an approach is called a "horizontal," "channel-parallel," or "Array Of Structures (AOS)" implementation. In some embodiments, a SIMD execution unit may receive an instruction along with four operands of data, where each operand is associated with a different vector. Each vector may include, for example, three location values (e.g., X, Y, and Z) associated with a three-dimensional graphics location. The execution unit may then simultaneously execute the instruction for all of the operands in a single instruction period. Such an approach is called a "vertical," "channel-serial," or "Structure Of Arrays (SOA)" implementation.

Although some embodiments described herein are associated with a four and eight way SIMD execution units, note that a SIMD execution unit could have any number of channels more than one (e.g., embodiments might be associated with a thirty-two channel execution unit).

Figure 4:
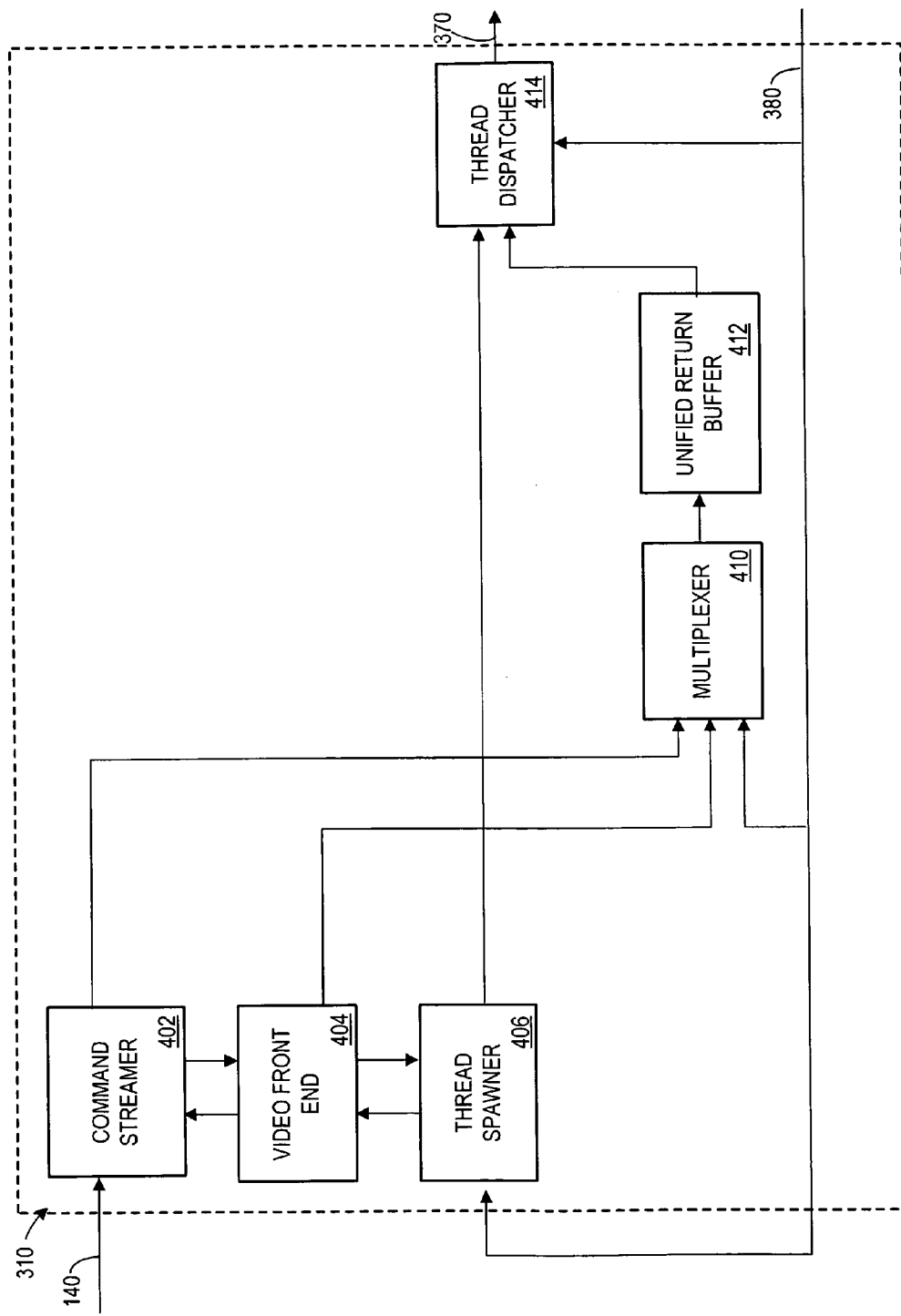
FIG. 4 is schematic a block diagram of a thread generator of FIG. 1, according to some embodiments.

FIG. 4 is a functional block diagram of the thread generator 310, in accordance with some embodiments. Referring to FIG. 4, in some embodiments, a thread generator 310 may include a command streamer 402, a video front end 404, a thread spawner 406, a multiplexer 410, memory (sometimes referred to herein as a unified return buffer (URB)) 412, and a thread dispatcher 414.

The command streamer may be coupled to the video front end 404 and the multiplexer 410. The video front end 404 may be coupled to the thread spawner 406 and the multiplexer 410. The multiplexer may be coupled to the unified buffer return, which may be coupled to the thread dispatcher.

In some embodiments, coupling, e.g., electrical connections, between the various portions of the portion of the processing system 400 may be dedicated, shared (e.g., a bus) and/or any combination thereof. In that regard, in some embodiments, the coupling, e.g., electrical connections, to the memory, e.g., the URB, from the command streamer, the video front end and the execution unit may comprise one or more shared data buses. In some embodiments, each of the other coupling, e.g., electrical connections, may comprise one or more dedicated signal lines.

An input of the command streamer 402 may receive commands. The inputs commands may be supplied by any source of commands, including, but not limited to, for example, a host processor and/or input device 110 (FIG. 1). In some embodiments, the command streamer 402 comprises a direct memory access (DMA) engine to fetch such commands from a memory. In some such embodiments, the DMA engine is configured as a ring buffer.

One or more of the commands may comprise a request to generate a thread. Such a command may have any form. In some embodiments, the request may include information that may be used in the course of generating the thread.

One or more portions of a command requesting a thread may be supplied to an input of the video front end 404. If a command requests a thread, the video front end 404 may supply a thread request in response thereto. The thread request supplied by the video front end 404 may have any form. Thus, the thread request supplied by the video front end 404 may or may not have the same form as the request supplied to the command streamer 402 and/or video front end 404. In some embodiments, the thread request includes information that may be used to generate the thread.

The thread request from the video front end 404 may be supplied to a first input of the thread spawner 406, a second input of which may receive thread requests generated by one or more threads running in the execution unit. Notably, a thread request resulting from a host command is sometimes referred to hereinafter as a root thread request. A thread request from the execution unit is sometimes referred to hereinafter as a spawn thread request. A thread created by another thread running in an execution unit is called a child thread. Child threads can create additional threads, all under the tree of a root thread.

Figure 6:
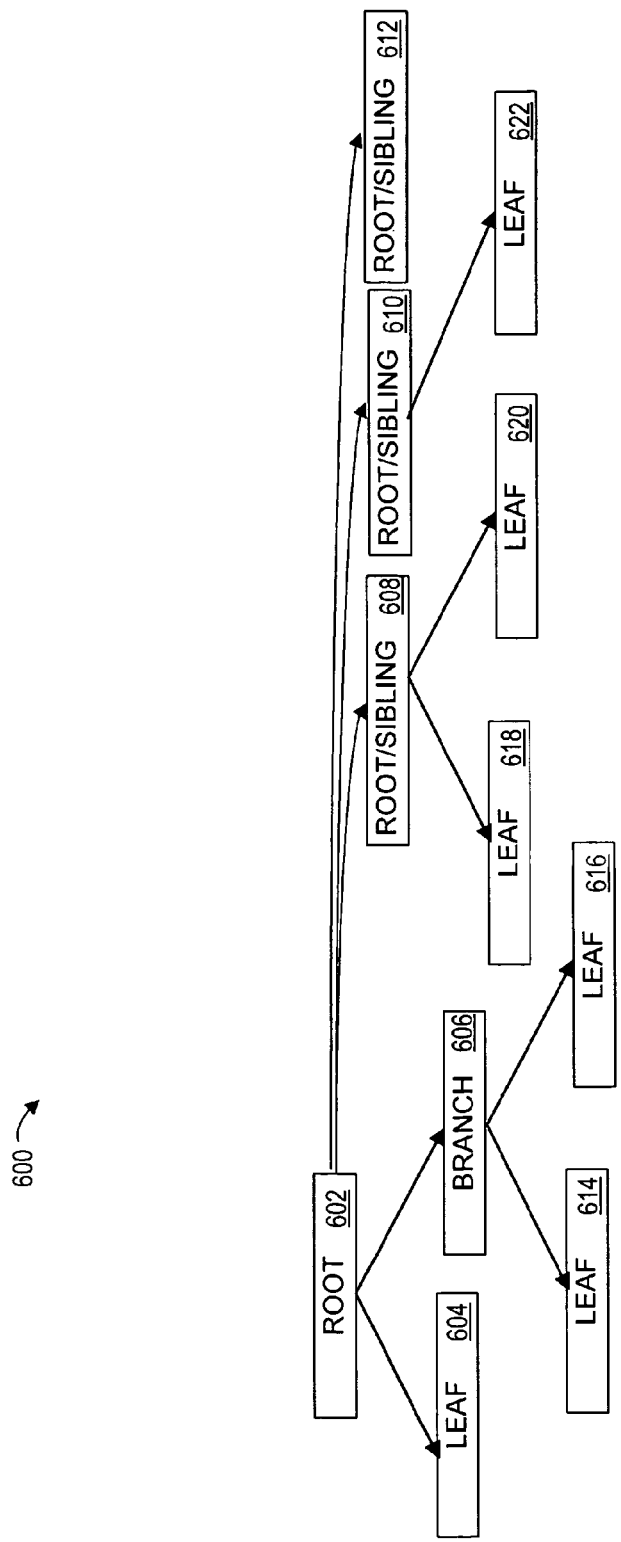
FIG. 6 is a schematic diagram of a thread relationship in accordance with some embodiments.

FIG. 6 is a schematic diagram of a thread relationship in accordance with some embodiments. Referring to FIG. 6, in some embodiments, a thread relationship may include a single tree structure 600. The single tree structure 600 may include a single root thread 602 that generates a plurality of child threads 604-612. Some child threads may generate subsequent child threads. For example, child thread 606 may generate child threads 614, 616. Child thread 608 may generate child threads 618, 620. Child thread 610 may generate child thread 622. Root threads 608, 610, 612 depend on root thread 602 and are referred to as synchronized root threads, as further described hereinafter.

Figure 7:
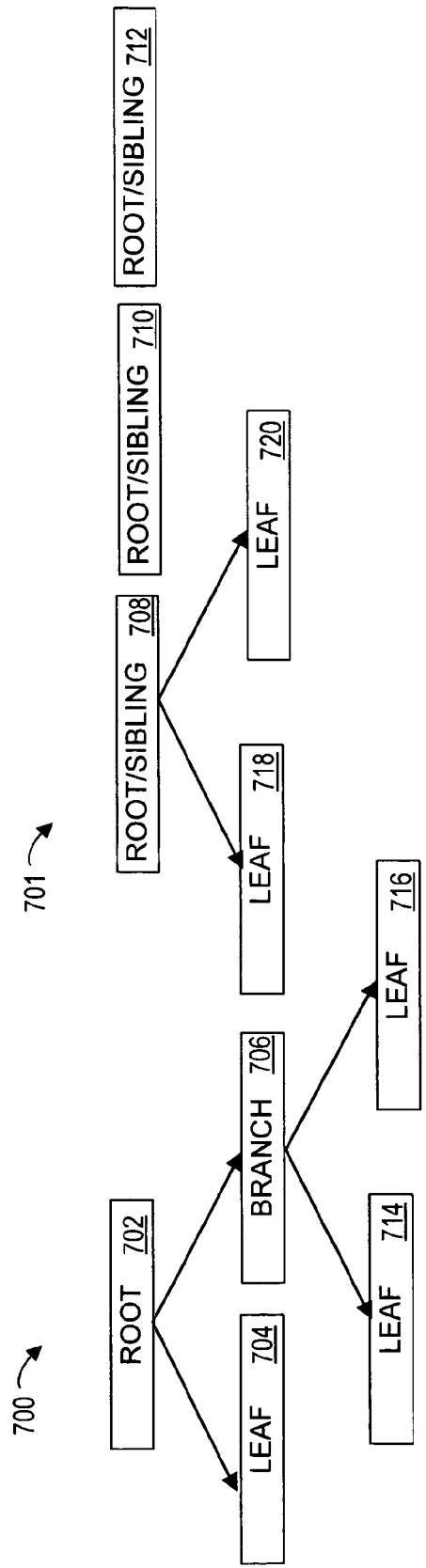
FIG. 7 is a schematic diagram of a thread relationship in accordance with some embodiments.

FIG. 7 is a schematic diagram of a thread relationship in accordance with some embodiments. Referring to FIG. 7, in some embodiments, a thread relationship may include a multiple disconnected trees 700, 701. The first tree 700 has a first root thread 702 having child threads 704, 706. Child thread 706 may generate child threads 714, 716. Root thread 708 may have sibling root threads 710, 712. Root thread 708 may generate child threads 718, 720. Root thread 708 may generate child threads 718, 720. Root thread 702 may have sibling root threads 708, 710, 712. Root threads 702 and sibling root threads 708, 710, 712 are independent and are referred to as unsynchronized root threads, as further described hereinafter.

Referring again to FIG. 4, the thread spawner 406 may queue and/or arbitrate the thread requests and may supply thread requests based at least in part thereon. A thread request supplied by the thread spawner 406 may have any form and thus may or may not have the same form as the request supplied to the command streamer 402, the request supplied to the video front end 404 and/or the request supplied to the thread spawner 406.

Thread requests from the thread spawner 406 may be supplied to a first input of the thread dispatcher 414, further described hereinafter.

In some embodiments, the command streamer 402 and video front end 404 may also supply information to inputs of the multiplexer 410. Another input of the multiplexer may receive information from the execution unit.

An output of the multiplexer 410 may supply the information received from the command streamer 402, the video front end 404 and the execution unit, which may be supplied to the memory 412, which as stated above is sometimes referred to herein as a unified return buffer (URB).

In some embodiments, the memory 412 may be partitioned into two or more partitions. In some such embodiments, an index, sometimes referred to herein as a handle or URB handle, may be used as a pointer to reference one of such partitions in the memory. One of such partitions, sometimes referred to herein as a constant URB, may be used to store one or more constants.

In some embodiments, one or more portions of the memory may be disposed on the same chip as the command streamer 402, the video front end 404, the thread spawner 406 and/or the thread dispatcher 414.

An output of the memory or URB 412 may supply information, which may be supplied to a second input of the thread dispatcher 414. The thread dispatcher 414 may dispatch a thread for each such thread supplied thereto. In some embodiments, the thread dispatcher 414 processes the thread requests one at a time. That is, the thread dispatcher 414 may not request and/or accept a thread request until the dispatcher 414 has dispatched a thread for the previous thread request supplied thereto.

In some embodiments, control information may be supplied to the thread dispatcher and may be used to dispatch the thread(s), such as for example, configuring and/or allocating the number of registers that may be required by the thread(s).

Threads may be dispatched in any manner. In that regard, in some embodiments, the thread dispatcher 414 may dispatch threads in a "round-robin" fashion. For example, in some embodiments, the execution unit may comprise multiple execution units each of which may be capable of executing multiple threads. In some such embodiments, the thread dispatcher may assign a first thread to a first thread slot in a first execution unit, a second thread to a first slot in a second execution unit, a third thread to a first slot in a third execution unit, a fourth thread to a first slot in a fourth execution unit, a fifth thread to a second slot in the first execution unit, and so on. If the execution unit completes execution of a thread, an end of thread message may be generated, for example, by the execution unit, and supplied to the thread spawner 406.

Figure 5:
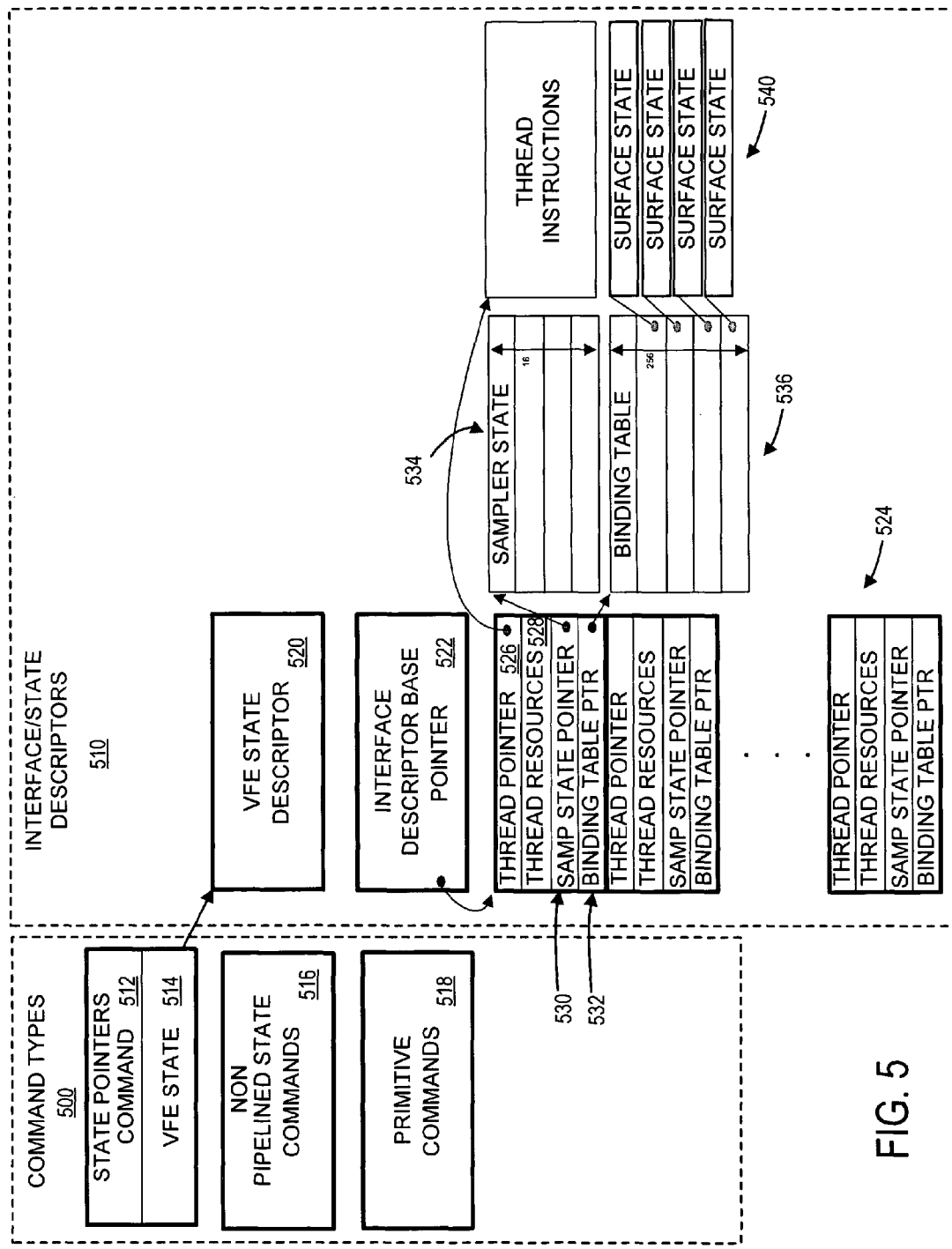
FIG. 5 is schematic diagram of commands and a state model, according to some embodiments.

FIG. 5 is a schematic illustration of a sequence of commands 500 that may be supplied to the processing system to request a thread and a state model 510 that may be used to define information related to a thread, in accordance with some embodiments. Referring to FIG. 4, in some embodiments, a sequence of commands used to request a thread may include a state pointers command 512, non pipelined state commands 516 and primitive commands 518.

A state pointers command 512 may 'indirectly' provide state information that controls fixed functions in the pipeline (e.g., the video front end 404 and/or the thread spawner 406), by providing at least one pointer to a state descriptor which contains state information. In some embodiments, a state pointers command may include a VFE state pointer 514, which may point to a VFE state descriptor 520. In some such embodiments, the VFE state descriptor may include an interface descriptor base pointer, which may point to the base of the interface descriptors.

A non-pipelined state command 516 may 'directly' provide state information that controls fixed functions and memory associated with the pipeline. One type of non-pipelined state command may configure partitioning of the memory, which as stated above may be disposed on the same chip as the command streamer 402, the video front end 404, the thread spawner 406 and/or the thread dispatcher 414. Another type of non-pipelined state command is a constant command, sometimes referred to herein as a constant URB command, which may define constant data, e.g., one or more constants. In some embodiments, data may be defined indirect (e.g., identified by one or more pointers to the memory) or/or in line (e.g., included in the command)

The primitive command 518 is another type of command that may be employed. In some embodiments, a primitive command may be used to request that one or more threads be generated. In some embodiments, a primitive command may include information, i.e., control and/or data, for the one or more threads to be generated. In some embodiments, control information may include information that may be used to configure the thread(s), such as for example, configuring and/or allocating the number of registers that may be required by the thread(s). In some embodiments, the control information may include an interface descriptor offset for a thread to be generated. In some embodiments, the interface descriptor pointer for a thread may be determined based on the interface descriptor offset and the interface descriptor base pointer (as stated above, in some embodiments, the video front end 404 may be supplied with a state pointers command that includes a VFE state pointer 514 which may point to a VFE state descriptor 520, which may include the interface descriptor base pointer).

The interface descriptors 510 may be used to define information related to a thread. The interface and state descriptors model may include an interface descriptor base pointer 522 and a plurality of interface descriptors 524. The interface descriptor base pointer 522 may provide a location of one or more interface descriptors (e.g., a first interface descriptor) of the plurality of interface descriptors 524.

In some embodiments, the interface descriptors 524 provide state information for threads that have been dispatched and/or are to be dispatched. In some embodiments, each interface descriptor 524 may include sufficient information for the thread spawner 406 and/or the thread dispatcher 414 to dispatch a thread.

In some embodiments, each of the plurality of interface descriptors 524 may include a thread pointer 526 and a thread resources descriptor 528, a sampler state pointer 530, a binding table pointer 532 and/or one or more other pointers that may be used for memory access and/or accessing other hardware functions. The thread pointer 526 may provide a location of one or more instructions (e.g., a first instruction) for a thread. The thread resources descriptor 528 may indicate the resources that may be required by the thread, e.g., a quantity of register files that may be required by the thread and/or the floating point mode. The sampler state pointer 530 may provide a location of one or more descriptors (e.g., a first descriptor) in a sampler state table 534. In some embodiments, the sampler state table 534 may include up to sixteen sampler state descriptors. In some embodiments, one or more of the sampler state descriptors are employed in association with three dimensional graphics. In some embodiments one or more of the sampler state descriptors provide one or more states of a sampler device(s) (e.g., a graphics texture sampler unit (not shown)).

The binding table pointer 532 may provide a location of one or more entries (e.g., a first entry) of a binding table 536. In some embodiments, the binding table 536 may include up to 256 entries. One or more of such entries in the binding table 536 may define a pointer that provides a location of a surface state descriptor 540. In some embodiments, one or more of the surface states may define a data array in memory and/or a data process associated with a data buffer. In some embodiments, one or more of the surface state descriptors 540 may describe how to handle an out of bound data access for a two dimensional image.

Each of the interface descriptors 524 may be stored in its own memory location(s), i.e., one or more memory locations that are different than the memory locations in which the other interface descriptors are stored. The location of a specific interface descriptor 524 may be determined by adding an index or offset, sometimes referred to herein as an interface descriptor index, to the interface descriptor base pointer. Thus, one or more aspects of the model may employ two levels of addressing. Moreover, one or more of such levels of addressing may comprise base+offset addressing.

In some embodiments, all of the Interface Descriptors have the same size and/or are organized as a contiguous array in memory. In some other embodiments, one or more of the Interface Descriptors has a different size, and/or is stored in a portion of memory that is not contiguous with, the other Interface Descriptors.

Referring also now to FIG. 4, in some embodiments, commands supplied to the command streamer 402 are the same as, and/or similar to, the commands illustrated in and/or described with respect to FIG. 5. In some such embodiments, the command streamer 402 may first receive a state pointers command. Upon receiving the state pointers command 512 (FIG. 5), the command streamer 402 may deliver the state pointer, which may indicate the location of the VFE state descriptor 520 (FIG. 5), to the video front end. The command streamer may thereafter receive one or more primitive commands. As stated above, in some embodiments, a primitive command may represent a request that one or more threads be generated. In some embodiments, a primitive command may include information, i.e., control and/or data, for the one or more threads to be generated. In some embodiments, control information may include information that may be used to configure the thread(s), such as for example, configuring and/or allocating the number of registers that may be required by the thread(s). In some embodiments, the control information may include an interface descriptor offset for a thread to be generated. In some embodiments, the interface descriptor pointer for a thread may be determined based on the interface descriptor offset and the interface descriptor base pointer (as stated above, in some embodiments, the video front end 404 may be supplied with a state pointers command that includes a VFE state pointer 514 which may point to a VFE state descriptor 520, which may include the interface descriptor base pointer). In some embodiments, the video front end 404 may determine the interface descriptor pointer for a thread based on the interface descriptor offset (which as stated above, may be included in a primitive command 518 (FIG. 5) and the interface descriptor base pointer 522 (as stated above, in some embodiments, the video front end may be supplied with a state pointers command that includes a VFE state pointer 514, which may point to a VFE state descriptor 520, which may include the interface descriptor base pointer 522).

In some embodiments, the thread request supplied to the thread spawner 406 may include the interface descriptor pointer. In some embodiments, the video front end 404 may generate an index or URB handle, which may be included in the thread request supplied to the thread spawner 406. In some embodiments, the thread request may include control information to indicate the number of registers allocated to the thread to be generated and whether thread will use the portion of memory that stores constants, e.g., the constant URB.

Figure 8:
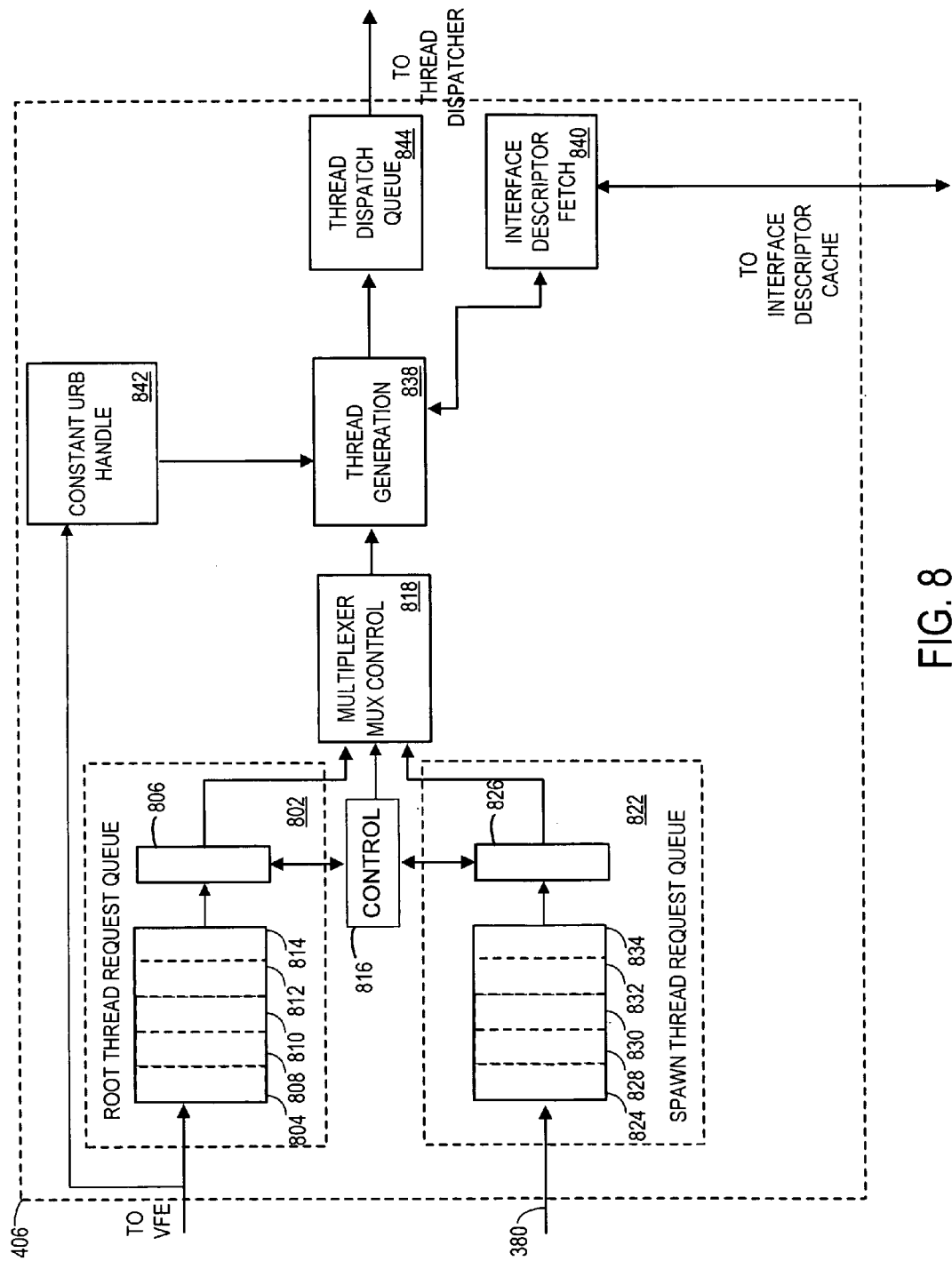
FIG. 8 is functional block diagram of a thread spawner of the thread generator of FIG. 4, according to some embodiments.

FIG. 8 is a functional block diagram of the thread spawner 406, in accordance with some embodiments. Referring to FIG. 8, in some embodiments, the root thread requests supplied by the video front end 404 (FIG. 4) may be supplied to an input of a root thread request queue 802. In some embodiments, the root thread request queue 802 may comprise a first in-first out (FIFO) buffer, meaning that the first root thread request into the queue802 is also the first root thread request out of the queue 802. In some such embodiments the root thread request queue 802 may include an input buffer 804, an output buffer 806 and one or more buffers, e.g., buffers 808-814, coupled therebetween. The output buffer 806 is sometimes referred to herein as a head 806 of the queue 802. In some embodiments, the output buffer 806, or head of the queue, may store the root thread request that will be next out of the root thread request queue 802.

A root thread request supplied by the root thread request queue 802 may be supplied to a first input of a multiplexer 818. The thread request supplied by the root thread request queue may have any form. In some embodiments, the thread request supplied by the root thread request queue 802 may have the same configuration as that of the thread request supplied to the thread spawner 406 from the video front end 404.

In some embodiments, a control unit 816 may control the timing for the supplying of a root thread request from the root thread request queue 802. In some embodiments, the control portion 816 may provide one or more signals synchronization and/or arbitration, as further described hereinafter. One or more signals from the control unit 816 may be supplied to the root thread request queue 802. In addition, one or more signals from the control unit 816 may be supplied to one or more control inputs of the multiplexer 818.

In some embodiments, the thread spawner 404 may further include a spawn thread request queue 822, an input of which may receive spawn thread requests supplied by the execution unit. The spawn thread request queue 822 may queue the spawn thread requests supplied thereto. In some embodiments, the spawn thread request queue 822 may comprise a first in-first out (FIFO) buffer. In some such embodiments, the spawn thread request queue 822 may include an input buffer 824, an output buffer 826 and one or more buffers, e.g., buffers 828-834, coupled therebetween. The output buffer 826 is sometimes referred to herein as a head of the queue or head of the queue buffer. In some embodiments, the output buffer 826, or head of the queue, may store the spawn thread request that will be next out of the spawn thread request queue 822.

In some embodiments, the root thread queue 802 and/or the spawn thread queue 822 may comprise one or more other types of queues in addition to, or in lieu of, a FIFO buffer. In some embodiments, for example, root thread requests may each be assigned a priority and the root thread request having the highest priority may be the first root thread request out of the queue 802. In some embodiments, for example, spawn thread requests may each be assigned a priority and the spawn thread request having the highest priority may be the first spawn thread request out of the queue 822.

A thread request supplied by the spawn thread queue 822 may be supplied to a second input of the multiplexer 818. The thread request supplied by the spawn thread request queue may each have any form. In some embodiments, the thread request supplied by the spawn thread request queue 822 may have the same configuration as that of the thread request supplied to the thread spawner 406 from the video front end 404.

In some embodiments, the control portion 816 may control the timing for the supplying of a spawn thread request from the spawn thread request queue 822. In some embodiments, the control portion 816 may provide one or more signals for synchronization and/or arbitration, as further described hereinafter.

In some embodiments, it may be desirable to supply only one thread request at a time (i.e., one thread request from the root thread request queue 802 or one thread request from the spawn thread request queue 822). For example, the thread generation unit may be able to handle only one thread request at a time. To that effect, arbitration may be provided. In some embodiments, thread requests in the spawn thread request queue 822 may be given priority over thread requests in the root thread request queue. In some embodiments, such arbitration may help to avoid deadlocks that might otherwise occur.

In that regard, in some embodiments, the control unit 816 may supply one or more control signals to the root thread request queue 802 and/or one or more control signals to the spawn thread request queue 822 to control the root thread request queue 802 and/or the spawn thread request queue 822 such that only one thread request is supplied at a time (i.e., one thread request from the root thread request queue 802 or one thread request from the spawn thread request queue 822). In such embodiments, the control unit 816 may also supply one or more control signals to the multiplexer 818, to control the multiplexer 818 such that the thread request is supplied to output of such multiplexer 818.

In addition, some embodiments may define a limit (programmable or non programmable) as to the number of root threads that may be permitted at any given time. In some embodiments, this limit is less than the maximum number of threads in the system in order to help avoid deadlock. A request for a root thread reaches the head 806 of the queue 802 and the number of root threads is at the limit, the root thread request queue 802 may wait until the number of root threads is less than the defined limit. In some embodiments, the thread spawner may continue to supply thread requests so long as a maximum number of threads has not been reached.

In some embodiments, root threads may be synchronized or unsynchronized. A synchronized root thread may be used to help ensure that the root thread is not generated until an event occurs. For example, if may be desirable to postpone a thread for a portion of a program until a thread for prior portion of the program has run to completion.

In some embodiments, requests for synchronized root threads and requests for unsynchronized root threads may be supplied to the same root thread request queue 802. In some such embodiments, a request for a synchronized root thread may not proceed beyond the head 806 of the root thread request queue 802 until a synchronization signal is supplied. In some embodiments, a synchronization signal is generated if a message, sometimes referred to herein as a spawn root message, is supplied to the spawn thread request queue 822 and reaches the head 826 of the spawn thread request queue 822. If the request for a synchronized root thread reaches the head 806 of the queue 802 before the spawn root message reaches the head 826 of the queue 822, the root thread request queue 802 waits for the spawn root message to reach the head 826 of the queue 822. To help avoid deadlock, the spawn root message may not be allowed to proceed beyond the head 826 of the spawn thread request queue 802 before the request for a synchronized root thread reaches the head 806 of the root thread request queue. In that regard, if the spawn root message reaches the head 826 of the queue 822 before the request for the synchronized root thread reaches the head 806 of the queue 802, the spawn thread request queue 822 waits for the request for the synchronized root thread reaches the head 806 of the queue 802. In some such embodiments, the request for synchronized root thread and the spawn root thread message may exit their respective queue at the same time as one another.

In some embodiments, a synchronized root thread may originate from a command that requests a synchronized root thread. In some embodiments, a command includes a synchronization field and a synchronized root thread is requested by setting a bit in such field. In some embodiments, the spawn root message may be initiated by a root thread and/or a child thread.

Some embodiments may not have any limit regarding the number of synchronized root threads, however, the number of requests for synchronized roots and the number of spawn root messages should be the same. Otherwise, in some embodiments, deadlock could occur.

As stated above, in some embodiments, the control unit 816 may supply one or more control signals to the root thread request queue 802 and/or one or more control signals to the spawn thread request queue 822 to control the root thread request queue 802 and/or the spawn thread request queue 822 to provide the desired operation. In such embodiments, the control unit 816 may also supply one or more control signals to the multiplexer 818, to control the multiplexer 818 such that the thread request is supplied to output of such multiplexer 818.

An output of the multiplexer 818 may supply the thread request to an input of the thread generation unit 838, an output of which may supply a thread request. The thread request supplied by the thread generation unit 838 may have any form and in some embodiments, may include but is not limited to, an interface descriptor and/or an index to memory, e.g., the constant URB handle.

In some embodiments, the thread generation unit 838 may supply the interface descriptor pointer to an interface descriptor fetch unit 840, which may fetch the interface descriptor (e.g., from an interface descriptor cache) and supply the interface descriptor to the thread generation unit 838. In addition, if the thread request supplied to the thread generation unit 838 indicates that the thread to be generated will use the portion of memory that stores constants, e.g., the constant URB, the thread generation unit 838 may also receive an index to the portion of memory that stores the constants, e.g., the constant URB handle from a constant URB handle unit.

The thread request supplied by the thread generation unit 838 may be supplied to an input of the thread dispatch queue 844. In some embodiments, the thread dispatch queue 844 may help to decouple the thread generator unit from the thread dispatcher. In such embodiments, the thread dispatch queue may help to make it possible for the generation unit 838 and the thread dispatcher 414 to operate concurrently and/or asynchronously (without synchronization) with respect to one another. In some embodiments, the root thread request queue 844 may comprise a first in-first out (FIFO) buffer, or any other type of queue.

In some embodiments, the root thread queue 802 may help to decouple the video front end 404 from the thread generation unit 838. In such embodiments, the root thread request queue 802 may thus help to make it possible for the video front end 404 and the thread generator 838 to operate concurrently and/or asynchronously (without synchronization) with respect to one another, even if the video front end and the thread generator do not have the same delay as one another.

In some embodiments, when a (parent) thread creates a child thread, the parent thread behaves like a fixed function (e.g. video front end 404). It may provide all necessary information to start the child thread, by assembling the payload in URB and then sending a spawn thread message to thread spawner 406 with an interface descriptor pointer for the child thread and a pointer for data in memory, e.g., URB.

In some embodiments, the interface descriptor for a child may be different from the parent—how the parent determines the child interface descriptor may be up to the parent. Some embodiments may require that the child interface descriptor be one from the interface descriptor array on the same interface descriptor base address.

In some embodiments, a root thread may be responsible for managing pre-allocated resources such as memory, e.g., URB, space and scratch space for its direct and indirect child threads. In some embodiments, for example, a root thread may split its URB space into sections. It can use one section for delivering payload to one child thread as well as forwarding the section to the child thread to be used as return URB space. The child thread may further subdivide the URB section into subsections and use these subsections for its own child threads. Such process may be iterated. Similarly, a root thread may split its scratch memory space into sections and give one scratch section for one child thread.

In some embodiments, multiple root threads may run concurrently in an execution unit. In some embodiments, there may be only one scratch space state variable shared for all root threads and all concurrent root thread requiring scratch space may share the same scratch memory size.

Figure 9:
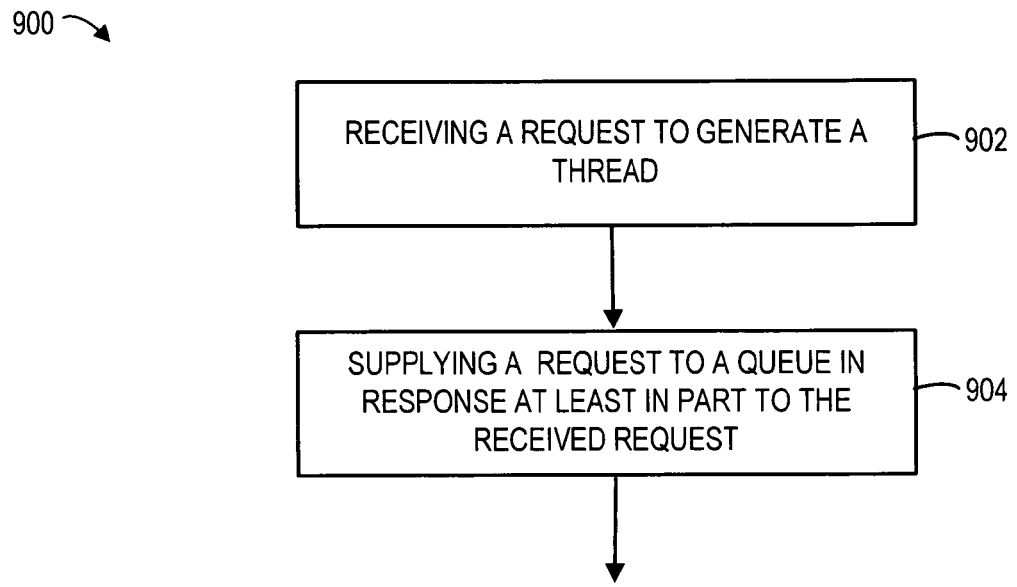
FIG. 9 is a flowchart of a method, according to some embodiments.

FIG. 9 is a flow chart 900 of a method according to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. In some embodiments, the method may be employed in one or more of the embodiments disclosed herein.

At 902, in some embodiments, a request to generate a thread may be received. In some embodiments, the request may include a first pointer. In some such embodiments, the first pointer may include an interface descriptor pointer.

At 904, a request may be supplied to a queue in response at least in part to the received request. In some embodiments, the request supplied to the queue may be based at least in part on the received request. In some embodiments, the request supplied to the queue may be the received request. In some embodiments, the received request and/or the supplied request includes a first pointer. In some such embodiments, the first pointer may include an interface descriptor pointer.

Some embodiments may further include fetching a plurality of instructions in response at least in part to the request supplied to the queue and executing at least one of the plurality of instructions. Executing at least one of the plurality of instructions may include supplying the at least one instruction to an execution unit to execute the at least one instruction. Some further embodiments may further include receiving a request from an execution unit to generate a thread; and supplying a request to a queue in response at least in part to the request from the execution unit.

Unless otherwise stated, terms such as, for example, "based on" mean "based at least on", so as not to preclude being based on, more than one thing. In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Some embodiments have been described herein with respect to a SIMD execution unit. Note, however, that embodiments may be associated with other types of execution units, such as a Multiple Instruction, Multiple Data (MIMD) execution unit.

The several embodiments described herein are solely for the purpose of illustration. Persons skilled in the art will recognize from this description other embodiments may be practiced with modifications and alterations limited only by the claims.

What is claimed is:

1. A method comprising:
receiving, in a processing system that includes at least one processor, a request to generate a first thread;
supplying a first request to a first queue in the processing system in response at least in part to the received request to generate a first thread;
receiving, in the processing system, a request to generate a second thread;
supplying a second request to a second queue in the processing system in response at least in part to the request to generate a second thread;
fetching a first plurality of instructions in response at least in part to the first request supplied to the first queue;
supplying at least one of the first plurality of instructions to an execution unit to execute the at least one of the first plurality of instructions;
fetching a second plurality of instructions in response at least in part to the second request supplied to the second queue;
supplying at least one of the second plurality of instructions to an execution unit to execute the at least one of the second plurality of instructions; and
supplying a spawn root message to the first queue;
wherein the second request supplied to the second queue is a request for a synchronized root thread; and
wherein the request for a synchronized root thread does not proceed beyond a head of the second queue until the spawn root message reaches a head of the first queue.

2. The method of claim 1 wherein receiving a request to generate a first thread comprises:
receiving a first pointer.

3. The method of claim 2 wherein fetching a first plurality of instructions in response at least in part to the first request supplied to the first queue comprises:
fetching a first plurality of instructions in response at least in part to the first pointer.

4. The method of claim 3 wherein fetching a first plurality of instructions in response at least in part to the first pointer comprises:
fetching a first plurality of instructions in response at least in part to the first pointer and a second pointer.

5. The method of claim 1 further comprising;
arbitrating between a request in the first queue and a request in the second queue.

6. The method of claim 1 wherein all requests supplied to the first queue are supplied at least in part in response to requests from the execution unit; and
wherein no requests supplied to the second queue are supplied at least in part in response to requests from the execution unit.

7. The method of claim 1 wherein the spawn root message does not proceed beyond the head of the first queue before the request for the synchronized root thread reaches the head of the second queue.

8. The method of claim 1 further comprising:
receiving, in the processing system, a request to generate a third thread; and
supplying a third request to the second queue in response at least in part to the request to generate a third thread;
wherein the third request supplied to the second queue is a request for an unsynchronized root thread.

9. An apparatus comprising:
circuitry to:
receive a request to generate a first thread;
supply a first request to a first queue in response at least in part to the received request to generate a first thread;
receive a request to generate a second thread;
supply a second request to a second queue in response at least in part to the request to generate a second thread;
fetch a first plurality of instructions in response at least in part to the first request supplied to the first queue;
supply at least one of the first plurality of instructions to an execution unit to execute the at least one of the first plurality of instructions;
fetch a second plurality of instructions in response at least in part to the second request supplied to the second queue; and
supply at least one of the second plurality of instructions to an execution unit to execute the at least one of the second plurality of instructions; and
supply a spawn root message to the first queue;
wherein the second request supplied to the second queue is a request for a synchronized root thread; and
wherein the request for a synchronized root thread does not proceed beyond a head of the second queue until the spawn root message reaches a head of the first queue.

10. The apparatus of claim 9 wherein the circuitry comprises:
the execution unit to execute the at least one of the first plurality of instructions.

11. The apparatus of claim 10 wherein the circuitry further comprises:
the execution unit to execute the at least one of the second plurality of instructions.

12. The apparatus of claim 9 wherein the circuitry comprises:
circuitry to receive a first pointer.

13. The apparatus of claim 12 wherein the circuitry comprises:
circuitry to fetch the first plurality of instructions in response at least in part to the first pointer and to execute the at least one of the first plurality of instructions.

14. The apparatus of claim 13 wherein the circuitry to fetch the first plurality of instructions in response at least in part to the first pointer comprises:
circuitry to fetch the first plurality of instructions in response at least in part to the first pointer and a second pointer.

15. The apparatus of claim 9 wherein the circuitry comprises:
the first queue.

16. The apparatus of claim 15 wherein the circuitry further comprises:
the second queue.

17. The apparatus of claim 16 wherein the circuitry further comprises:
circuitry to arbitrate between a request in the first queue and a request in the second queue.

18. The apparatus of claim 9 wherein all requests supplied to the first queue are supplied at least in part in response to requests from the execution unit; and
wherein no requests supplied to the second queue are supplied at least in part in response to requests from the execution unit.

19. The apparatus of claim 9 wherein the spawn root message does not proceed beyond the head of the first queue before the request for the synchronized root thread reaches the head of the second queue.

20. The apparatus of claim 9 the circuitry further to:
receive a request to generate a third thread; and
supply a third request to the second queue in response at least in part to the request to generate a third thread;
wherein the third request supplied to the second queue is a request for an unsynchronized root thread.

21. An apparatus comprising:
a non-transitory storage medium having stored therein instructions that when executed by a machine result in the following:
receiving a request to generate a first thread;
supplying a first request to a first queue, in response at least in part to the received request to generate a first thread;
receiving a request to generate a second thread;
supplying a second request to a second queue in response at least in part to the request to generate a second thread;
fetching a first plurality of instructions in response at least in part to the first request supplied to the first queue;
supplying at least one of the first plurality of instructions to an execution unit to execute the at least one of the first plurality of instructions;
fetching a second plurality of instructions in response at least in part to the second request supplied to the second queue;
supplying at least one of the second plurality of instructions to an execution unit to execute the at least one of the second plurality of instructions; and
supplying a spawn root message to the first queue;
wherein the second request supplied to the second queue is a request for a synchronized root thread; and
wherein the request for a synchronized root thread does not proceed beyond a head of the second queue until the spawn root message reaches a head of the first queue.

22. The apparatus of claim 21 wherein all requests supplied to the first queue are supplied at least in part in response to requests from the execution unit; and
wherein no requests supplied to the second queue are supplied at least in part in response to requests from the execution unit.

23. The apparatus of claim 21 wherein the spawn root message does not proceed beyond the head of the first queue before the request for the synchronized root thread reaches the head of the second queue.

24. The apparatus of claim 21 the non-transitory storage medium further having stored therein instructions that when executed by a machine result in the following:
receiving, in the processing system, a request to generate a third thread; and
supplying a third request to the second queue in response at least in part to the request to generate a third thread;
wherein the third request supplied to the second queue is a request for an unsynchronized root thread.

25. A system comprising:
circuitry to:
receive a request to generate a first thread;
supply a first request to a first queue in response at least in part to the received request to generate a first thread;
receive a request to generate a second thread;
supply a second request to a second queue in response at least in part to the request to generate a second thread;
fetch a first plurality of instructions in response at least in part to the first request supplied to the first queue;
supply at least one of the first plurality of instructions to an execution unit to execute the at least one of the first plurality of instructions;
fetch a second plurality of instructions in response at least in part to the second request supplied to the second queue;
supply at least one of the second plurality of instructions to an execution unit to execute the at least one of the second plurality of instructions; and
supply a spawn root message to the first queue;
wherein the second request supplied to the second queue is a request for a synchronized root thread; and
wherein the request for a synchronized root thread does not proceed beyond a head of the second queue until the spawn root message reaches a head of the first queue; and
a memory unit to store at least one instruction for the first thread.

26. The system of claim 25 wherein the circuitry comprises:
the execution unit to execute the at least one of the first plurality of instructions.

27. The system of claim 26 wherein the circuitry further comprises:
the execution unit to execute the at least one of the second plurality of instructions.

28. The system of claim 25 wherein all requests supplied to the first queue are supplied at least in part in response to requests from the execution unit; and
wherein no requests supplied to the second queue are supplied at least in part in response to requests from the execution unit.

29. The system of claim 25 wherein the spawn root message does not proceed beyond the head of the first queue before the request for the synchronized root thread reaches the head of the second queue.

30. The system of claim 25 the circuitry further to:
receive a request to generate a third thread; and
supply a third request to the second queue in response at least in part to the request to generate a third thread;
wherein the third request supplied to the second queue is a request for an unsynchronized root thread.

* * * * *